UNITED STATES PATENT OFFICE.

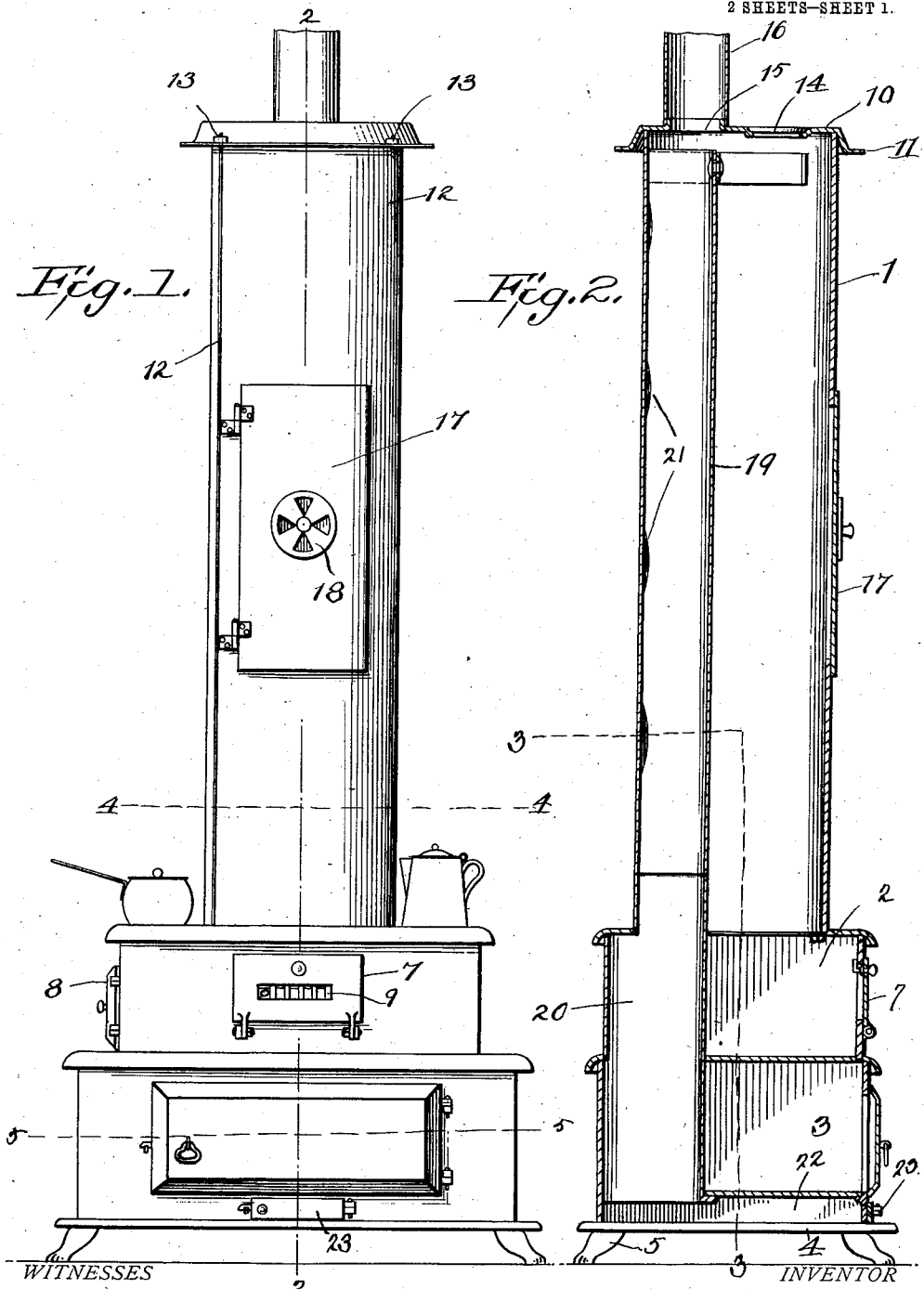
M. JONES.
COMBINED HEATING AND COOKING STOVE.
APPLICATION FILED MAY 20, 1912.
1,061,959.
Patented May 13, 1913.
2 SHEETS—SHEET 1.
INVENTOR
Moses Jones M. JONES.
COMBINED HEATING AND COOKING STOVE.
APPLICATION FILED MAY 20, 1912.
1,061,959.
Patented May 13, 1913.
2 SHEETS—SHEET 2.
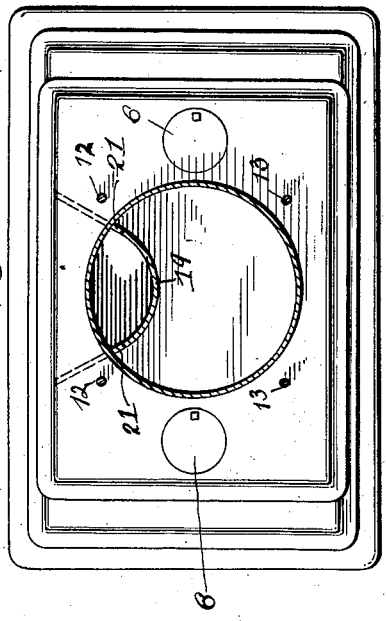
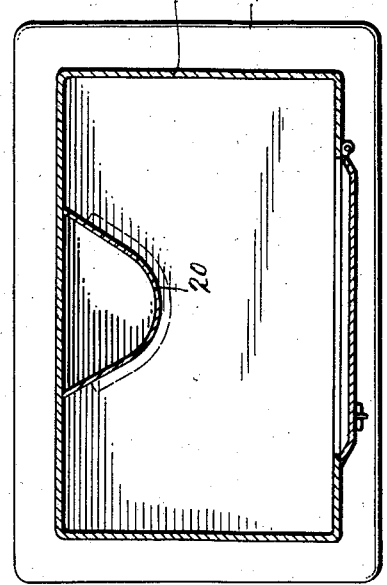
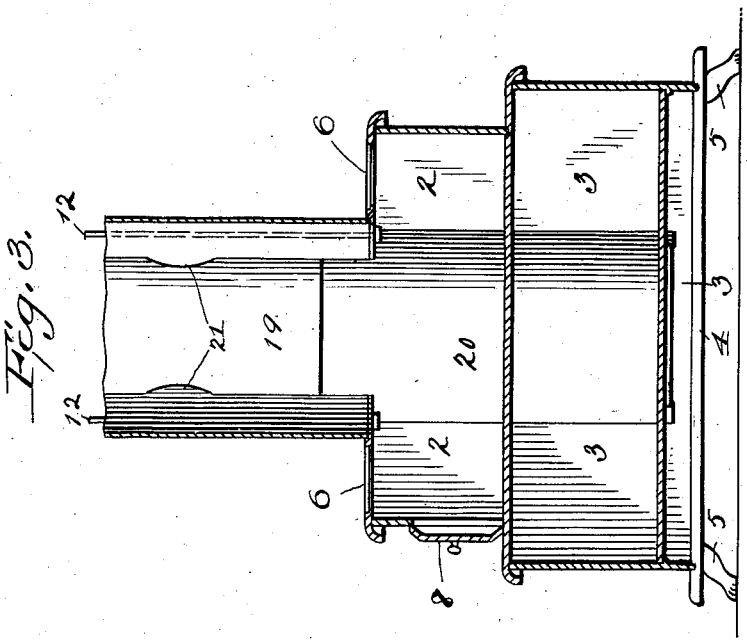
WITNESSES
INVENTOR
Moses Jones
By H. S. Lee Attorney

MOSES JONES, OF SOUTH MILLS, NORTH CAROLINA.

COMBINED HEATING AND COOKING STOVE.

1,061,959.   Specification of Letters Patent.   Patented May 13, 1913.

Application filed May 20, 1912. Serial No. 698,443.

*To all whom it may concern:*

Be it known that I, MOSES JONES, a citizen of the United States, residing at South Mills, in the county of Camden and State of North Carolina, have invented certain new and useful Improvements in Combined Heating and Cooking Stoves, of which the following is a specification.

The present invention relates to a combined heating and cooking stove which is peculiarly constructed so as to be advantageously used for baking, boiling, frying, and other cooking operations, and which also embodies novel features of construction whereby it can be readily adjusted so as to radiate a maximum amount of heat in cold weather and a minimum amount of heat in warm weather.

The object of the invention is to provide a stove of this character which is comparatively simple and inexpensive in its construction, which occupies but a small amount of floor space, and which can be readily adjusted as desired.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a front elevation of a combined heating and cooking stove constructed in accordance with the invention. Fig. 2 is a vertical sectional view through the same on the line 2—2 of Fig. 1. Fig. 3 is a vertical sectional view through the lower portion of the stove on the line 3—3 of Fig. 2. Fig. 4 is a horizontal sectional view on the line 4—4 of Fig. 1, and Fig. 5 is a similar view on the line 5—5 of Fig. 1.

Corresponding and like parts are referred to in the following description and indicated in all the views of the drawings by the same reference characters.

Specifically describing the present embodiment of the invention, the numeral 1 designates an upright cylindrical body portion which rests upon a fire box 2 and is in communication therewith through an opening in the top of the fire box. The fire box in turn rests upon an oven 3, the said oven being supported by a base 4 which is held in a slightly elevated position by suitable legs 5. The oven 3 extends laterally beyond the fire box 2, and the said fire box in turn extends laterally beyond the body portion 1. The top of the fire box is provided on opposite sides of the body portion with openings which are normally closed by lids 6, the said openings being used for cooking purposes in the usual manner. Pots and kettles may be placed upon the top of the fire box, and the before mentioned openings therein may be utilized for heating a frying pan or the like. A door 7 is formed in the front of the fire box, while a second door 8 is provided at one side of the fire box. The door 7 is formed with the usual damper 9, while the door 8 is utilized for removing ashes and debris from the stove.

A top 10 rests removably upon the upper end of the body portion 1 and is formed with an annular flange 11 which is engaged by tie rods 12 extending downwardly to the fire box on the exterior of the body portion. The upper ends of these tie rods 12 are capped by nuts 13, and by removing these nuts the cap and body portion can be elevated from the fire box.

In cold weather, a long body portion is employed so as to radiate a maximum amount of heat, while in warm weather a short body portion is substituted for the long body portion so as to radiate a minimum amount of heat. The short and long body portions are interchangeable, and can be quickly substituted one for the other, a set of short tie rods 12 being employed for the short body portion, while a set of long tie rods is employed for the long body portion.

The top 10 is provided with an opening normally closed by a lid 14, and is also formed with a smoke hole 15 which communicates with the smoke pipe 16.

The front of the body portion 1 is provided with a door 17 having a damper 18 at the middle thereof, the back of the body portion being provided with a flue 19 which communicates at the lower end thereof with a similar flue 20 extending downwardly through the fire box and oven. The upper end of the flue 19 terminates slightly short of the smoke hole, and inlets 21 are provided at the sides of the flue. This flue does not interfere in any manner with the draft of the stove, and serves to convey soot and cinders downwardly to a soot chamber 22 provided under the oven 3.

With the above construction, it will be obvious that the smoke and gases of combustion will pass upwardly through the smoke pipe, while soot and cinders will drop through the flues 19 and 20 into the chamber 22, from this chamber 22 the soot can be removed through a suitable soot opening which is normally closed by a small door 23.

Having thus described the invention, what I claim as new and desire to secure by Letters Patent, is:—

1. In a stove, the combination of an oven having a soot chamber under the same, a fire box superposed upon the oven, a soot flue extending through the fire box and oven and communicating with the soot chamber, an upright body portion projecting upwardly from the fire box and having a soot flue communicating with the before mentioned soot flue of the oven and fire box, the fire box extending laterally on opposite sides of the body portion to provide areas adapted to be utilized for cooking purposes, and a top supplied to the body portion.

2. In a stove, the combination of an oven, a soot chamber under the same, a fire box arranged above the said oven, a soot flue arranged at the rear of and within said oven and fire box and communicating with said soot chamber, a cylindrical body portion vertically and removably superposed upon said fire box and having a soot flue arranged in a rear portion therein and registering with said before mentioned soot flue of the oven and fire box, a top for said body portion provided with a stack opening therein, and means for securing said body portion to said fire box, said fire box extending laterally on opposite sides of said body portion to provide areas adapted to be utilized for cooking purposes.

In testimony whereof I affix my signature in presence of two witnesses.

MOSES JONES.

Witnesses:
BERTHA FOSTER,
CLARENCE DOZIER.

Copies of this patent may be obtained for five cents each, by addressing the "Commissioner of Patents, Washington, D. C."